Oct. 4, 1960  C. J. CISLO  2,954,850
ACTUATING MECHANISM FOR DISK BRAKE
Filed Dec. 13, 1956  3 Sheets-Sheet 1

INVENTOR.
Casimer J. Cislo
BY
D. C. Staley
HIS ATTORNEY

Oct. 4, 1960 C. J. CISLO 2,954,850
ACTUATING MECHANISM FOR DISK BRAKE
Filed Dec. 13, 1956 3 Sheets-Sheet 2

INVENTOR.
Casimer J. Cislo
BY
D.C. Staley
HIS ATTORNEY

INVENTOR.
Casimer J. Cislo
BY
D.C. Staley
HIS ATTORNEY

United States Patent Office 2,954,850
Patented Oct. 4, 1960

2,954,850

ACTUATING MECHANISM FOR DISK BRAKE

Casimer J. Cislo, Detroit, Mich., assignor to General Motors Corporation, Detroit, Mich., a corporation of Delaware Filed Dec. 13, 1956, Ser. No. 628,167

10 Claims. (Cl. 188—71)

This invention relates to mechanisms for operating disk brakes adapted for use on vehicles.

Among the problems for satisfactory operation of disk brakes on motor vehicles are those of securing a sufficiently high force application to effectively apply the disk brakes, particularly by a manually operated lever mechanism for emergency or parking brake applications and to provide for a uniform distribution of the applying force to the disk brake so as to distribute the applying force uniformly around the face area of the disk brake. A part of this problem has been overcome by the use of an annularly arranged hydraulically operated piston element that operates in an annular chamber which receives hydraulic fluid from a hydraulic master cylinder of a hydraulic brake actuating system, the annularly arranged piston being adapted to provide for even distribution of brake applying force to the disk brake.

Since the parking or emergency brake of a motor vehicle is required to be applied completely independently of the hydraulically operated foot brake system, and since the parking or emergency brake system must not depend upon the hydraulics of the hydraulic foot brake system, it is required that the parking or emergency brake system be mechanically operated.

In disk brakes, the problem therefore remains to obtain a sufficiently satisfactory mechanical leverage system to secure a satisfactory brake apply force that will cause the disk brakes to function effectively under operation of the manually applied emergency brake system. There also remains the problem of providing for a uniform distribution of the apply force of the emergency brake system over the area of the disk brake.

In this invention therefore there is provided a plurality of force apply elements each of which is provided with a curvilinear surface wherein the force apply elements have the curvilinear surfaces in engagement, with the apply elements being disposed generally in a longitudinally extending series arrangement with the longitudinal arrangement of the elements taking the general form of an annulus and positioned between a stationary wall and the movable element of a disk brake. The force apply elements are disposed in offset relation linearly relative to one another so that when a force is supplied to the series of elements in a longitudinal direction at one end of the series of elements, the force apply elements will move transversely relative to the longitudinal extent of the elements so as to effect axial movement of a movable member of a disk brake and thereby effect braking action. Since the series of force apply elements are disposed in longitudinal arrangement in the general form of an annulus, the resultant transverse movement of the elements relative to one another over the length of the series arrangement of the elements will effect a uniform distribution of brake apply force to the movable element of the disk brake. Also since the force apply elements are offset with respect to one another in a linear direction, there is a force multiplication effected between the force apply elements which greatly multiplies the manually applied force at the one end of the series of elements. The degree of force multiplication can be varied or controlled by the angle of offset of the elements relative to one another from a true linear arrangement.

Figure 1:
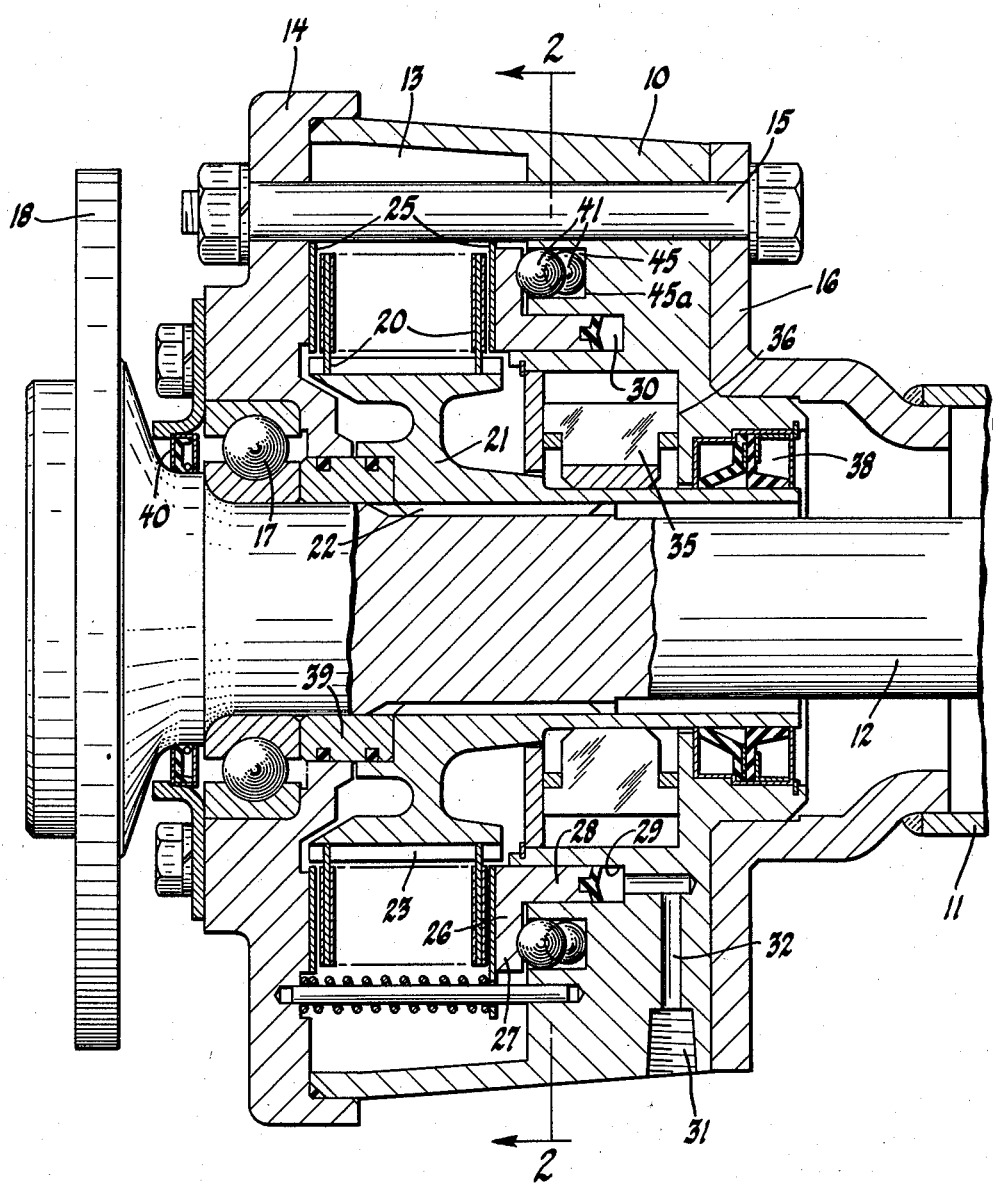
Figure 1 is a cross sectional view of a disk brake incorporating features of this invention.

In this invention the disk brake comprises a brake housing 10 that is secured to an axle housing 11 within which is carried the rear axle 12 of a motor vehicle. The brake housing 10 has a chamber 13 that is closed by a cover plate 14, the cover plate being secured to the housing 10 by means of bolts 15 which also secure the housing 10 to a mounting flange 16 that is welded to the axle housing 11. The cover plate 14 supports an anti-friction bearing 17 that in turn supports the wheel axle 12, the axle 12 having the wheel flange 18 that supports the vehicle wheel in conventional manner.

The disk brake comprises a series of rotatable disks 20 that are supported upon the carrier member 21 that is supported upon the axle 12 and is splined thereto by the spline connection 22 so that the member 21 rotates with the wheel axle 22. The brake disks 20 are supported upon the spline 23 on the outer periphery of the member 21 so that the disks 20 rotate with the member 21 but can move axially relative to one another. A series of non-rotatable disks 25 are disposed alternately between the rotatable disks 20. The non-rotatable disks 25 have grooves in their outer peripheral edges that engage the mounting bolts 15 whereby to prevent rotation of the disks 25 but provide for axial movement of them relative to one another and relative to the rotatable disks 20.

A pressure plate 26 engages one end of the disk stack 20, 25 to effect axial movement of the disks relative to one another and thereby effect engagement of the rotatable disks with the non-rotatable disks for a brake application. The pressure plate 26 includes a radial flange 27 and an annular axle portion 28. The portion 28 provides an annular piston that slides within the annular groove 29 that cooperates with the piston 28 to form a fluid receiving chamber 30. The chamber 30 receives fluid under pressure from a master cylinder of a hydraulic brake operating system through a port 31 and a passage 32 whereby to effect axial movement of the pressure plate 26 to effect a brake application of the disk stack 20, 25.

A vane type liquid pump 35 is provided in the pump chamber 36 in the brake housing 10 and is to be rotated with the axle 12 to effect circulation of cooling fluid through the disk stack 20, 25, a suitable inlet (not shown) being provided for the pump to receive fluid from a cooling system for delivery into the chamber 13 internally of the disk stack 20 so that the cooled liquid will circulate radially outwardly through the disk stack 20, 25 into the chamber 13 on the outer periphery of the disk stack from which the heated liquid will pass through an outlet (not shown) for return to the heat exchange system to cool the liquid. A seal 38 is provided around the axle 12 to prevent coolant fluid from passing into the axle housing 11, and to prevent grease from the axle housing passing into the disk brake structure. Seals 39 and 40 prevent loss of coolant fluid through the anti-friction bearing 17.

Figure 2:
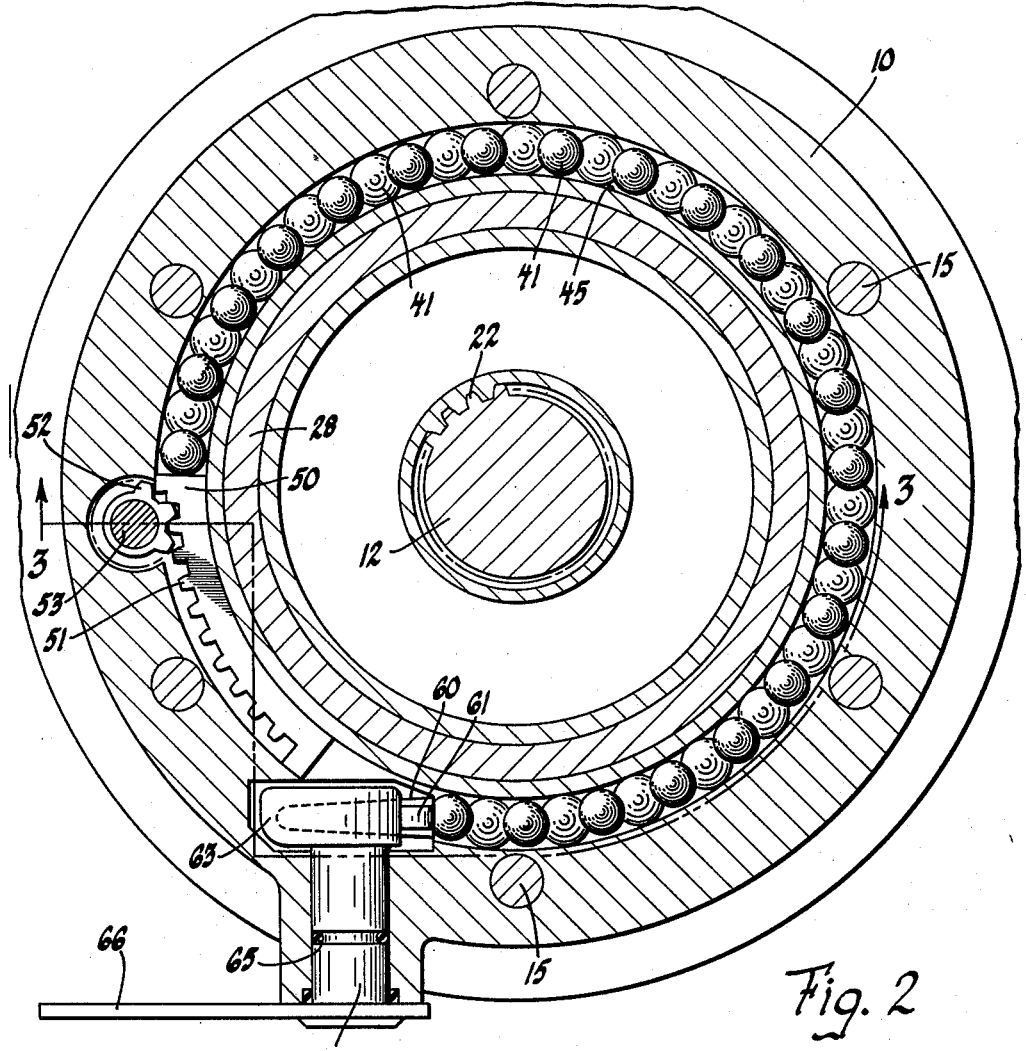
Figure 2 is a transverse cross sectional view taken generally along line 2—2 of Figure 1.
Figure 3:
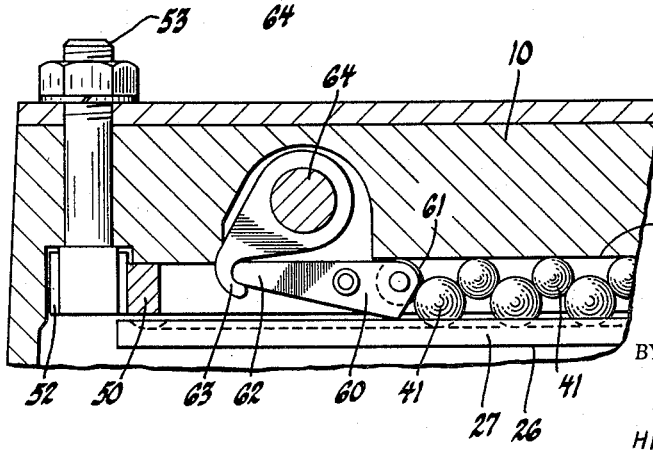
Figure 3 is a cross sectional view taken along line 3—3 of Figure 2.
Figure 6:
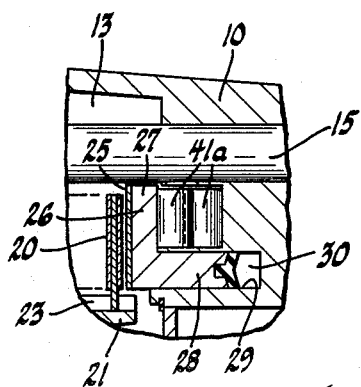
Figure 6 is a partial cross sectional view of the force apply mechanism illustrating a modified form of the invention.

To provide for a parking or emergency brake applying device independent of the hydraulic force applying device heretofore described, the brake housing 10 is provided with an annular groove or recess 45 around the fluid receiving chamber 30 and in axial arrangement with the radial flange 27 of the pressure plate 26. A series of force apply elements 41 are disposed in the annular groove 45 generally in a longitudinally extending series arrangement with the series arrangement of the elements taking the general form of the annulus provided by the groove 45, as more particularly shown in Figure 2. Each of the force apply elements have curvilinear surfaces that are disposed in engagement with adjacent elements so that only point or line contact is provided between the elements depending upon whether they are in the form of balls as illustrated in Figure 2 or in the form of small cylinders 41a as illustrated in Figure 6. The force apply elements 41 or 41a are disposed in offset relation linearly relative to one another as shown in Figure 3 so that alternate of the elements will engage the flange 27 of the pressure plate 26 and the rear wall 45a of the recess or groove 45 respectively. With the force apply elements being disposed in offset relation, as shown in Figure 3, when a pressure is supplied in a longitudinal direction to the series of elements they will tend to move laterally relative to their longitudinal extent and laterally of the groove 45 so that the pressure plate 26 will be moved axially of the disk stack 20, 25 and thereby effect engagement of the rotating and non-rotating brake disks. The angular displacement of the force apply elements 40 relative to a true linear arrangement provides for a force multiplication of the force applied in a longitudinal direction to the series of elements, the degree of force multiplication obtained being controlled by the angle of offset relation of one element relative to the other from a true linear arrangement.

As shown in Figure 2 one end of the series of force applying elements 41 engages an abutment 50 that is in the form of an arcuate segment slidable in the groove 45. This abutment 50 is normally stationary, but has a series of teeth forming a rack 51 engaged by a pinion 52 that is carried on the shaft 53, the pinion and shaft being integral and extending exteriorly of the housing, as shown in Figure 3 so that rotation of the shaft and pinion will effect longitudinal adjustment of the force apply elements.

The opposite end of the series of elements engage a pressure applying member 60 that has a roller 61 engaging the end-most force applying element 41. This member 60 has its opposite end 62 engaging a lever 63 that is carried on the shaft 64 that extends exteriorly of the housing 10, as shown in Fig. 2. The shaft 64 carries an O ring seal 65. The exterior end of the shaft 64 carries an actuating lever 66 that is connected to a manually operated brake applying device located within the passenger compartment of a vehicle to effect a parking or emergency brake application. Such mechanically operated mechanisms are well-known in the art and are therefore not illustrated herein.

From Figures 2 and 3 it will be apparent that counterclockwise rotation of the shaft 64 will effect pressure application in a longitudinal direction on the series arrangement of force apply elements 41. With the abutment 50 preventing free rotation of the elements 41 within the groove 45, it will be apparent that when longitudinal force is applied to the series of elements they can only move laterally with respect to the groove 45 and thereby effect axial movement of the pressure plate 26 to effect engagement of the brake disks 20, 25. Since the force apply elements 41 are disposed in the form of an annulus around the periphery of the flange 27 of the pressure plate 26, there will be an even distribution of brake applying force around the area of the disks.

Since the force apply elements 41 are confined between the force applying member 60 and the abutment 50 it will be apparent that when the abutment 50 is moved within the groove 45 by rotation of the pinion 52, the force apply elements 41 will move laterally and this lateral movement can be utilized for adjusting the normal clearance between the rotating and non-rotating disks of the disk brake.

Figure 5:
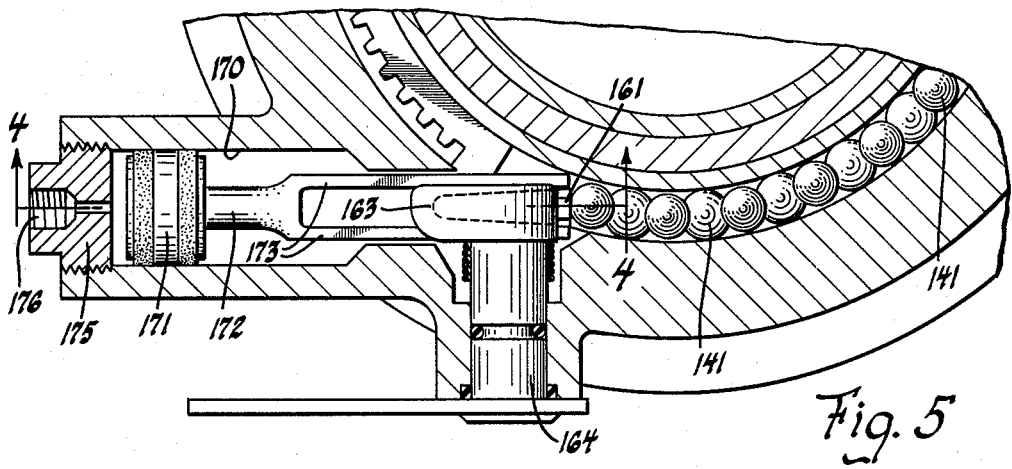
Figure 5 is a cross sectional view taken along line 5—5 of Figure 4.
Figure 4:
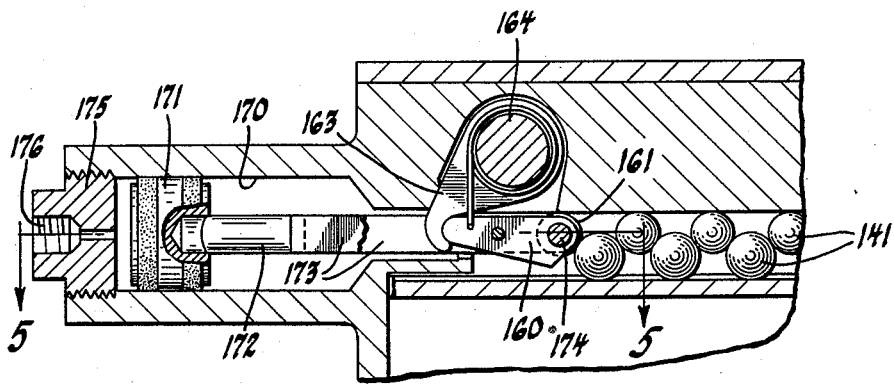
Figure 4 is a cross sectional view similar to Figure 3 but illustrating a modified arrangement of the mechanism incorporating a hydraulic cylinder and piston unit and is taken along line 4—4 of Figure 5.

Figures 4 and 5 illustrate a modified arrangement of the structure of the invention wherein the force apply elements 41 also serve to effect application of the disk brake under control of the hydraulically operated master cylinder of the foot operated brake system. Thus the one series of force apply elements 41 can be used for both the emergency or parking brake system and the hydraulically operated foot brake system and yet maintain independence of operation of the two systems.

In Figures 4 and 5 the force apply elements 141 are engaged by a pressure applying means 160 that is actuated by a lever 163 carried on a rotating shaft 164 in the same manner as the comparable elements of the device of Figures 2 and 3. Thus the force applying elements 141 are operated to effect a brake application through the manually operated device 160 in the same manner as the force apply elements 41 of Figures 2 and 3.

In Figures 4 and 5 an additional hydraulically operated device is provided to also effect operation of the force apply elements 141. This hydraulically operated device comprises a cylinder 170 having a piston 171 reciprocable therein. The piston 171 has an actuating rod 172 extending forwardly therefrom and is provided with a yoke 173 that straddles the force applying member 160 and is connected thereto by the pin 174 that also retains the roller 161 on the force applying member 160. The cylinder 170 is closed by a plug 175 that has a port 176 that is adapted for connection with the master cylinder (not shown) of a hydraulic brake system whereby fluid under pressure will be delivered from the master cylinder into the cylinder 170 to advance the piston 171 when the foot brake pedal of the vehicle is actuated by the operator. This advancement of the piston 171 will move the force applying member 160 in a direction to effect longitudinal movement of the series arranged force applying elements 41 in the same manner as heretofore described with reference to the actuation effected by the member 163.

It will thus be seen from the foregoing description that the foot operated hydraulic brake system can be completely independent of the manually operated parking brake system, as disclosed in Figures 2 and 3, or it can be inter-related, and yet independent, as illustrated in Figures 4 and 5.

While the form of embodiment of the invention as herein disclosed constitutes a preferred form, it is to be understood that other forms might be adopted as may come within the scope of the claims which follow.

What is claimed is as follows:

1. In a brake structure for a vehicle, rotatable and non-rotatable disk brake means engageable on relative axial movement, axially movable pressure plate means connected with one of said disk brake means to effect said relative axial movement of the said brake means, a plurality of similarly shaped individual pressure apply elements having curvilinear surfaces disposed in either of two linear sequences of elements forming a generally longitudinally extending series arrangement with the curvilinear surfaces of adjacent elements in constant engagement and with adjacent engaging elements offset linearly relative to one another, said elements being positioned between said plate and stationary wall means in an annular chamber being of substantially the same diameter as the width of said chamber and with one end of the series of elements engaging an abutment, and pressure applying means engaging the opposite end of said series of elements effecting longitudinally directed pressure on the said series of elements with resultant movement of the curvilinear surfaces of engaging elements in relation to each other and transverse movement of one linear sequence of elements relative to the second linear sequence of elements of the longitudinal arrangement of the elements to effect opposing transverse forces by adjacent elements on said plate and on said stationary wall means for axial movement of said plate.

2. A brake structure in accordance with claim 1 in which the said elements comprise a series of balls.

3. A brake structure in accordance with claim 1 in which the said elements comprise a series of cylinders with a curvilinear surface of adjacent cylinders in engagement.

4. In a brake structure for a vehicle, rotatable and non-rotatable disk brake means engageable on relative axial movement, axially movable pressure plate means connected with one of said disk brake means to effect said relative axial movement of the said brake means, said pressure plate having a surface thereon forming a race to receive anti-friction elements, wall means adjacent said plate having a surface thereon forming a race cooperating with that on said pressure plate, a plurality of similarly shaped anti-friction elements having curvilinear surfaces and being of substantially the same diameter as the width of said races, said elements disposed between said races in generally longitudinally extending series arrangement with the curvilinear surfaces of adjacent elements in constant engagement and with adjacent engaging elements offset linearly relative to one another, said longitudinal series arrangement of elements forming a linear sequence of elements contacting said pressure plate and another linear sequence of elements contacting said wall means, one end of said series of elements engaging an abutment, and pressure applying means engaging the opposite end of said series of elements effecting longitudinally directed pressure on the said series of elements with resultant movement of alternate adjacent elements transversely of the longitudinal arrangement of the elements to effect thereby said axial movement of said plate.

5. In a brake structure for a vehicle, rotatable and non-rotatable disk brake means engageable on relative axial movement, an axially movable pressure plate means in the form of an annulus engageable with one of said disk brake means to effect said relative axial movement of the said brake means, said pressure plate means having a surface thereon forming an annular race for anti-friction elements, stationary wall means adjacent said pressure plate having an annular surface forming an annular race for anti-friction elements and cooperating with that on said pressure plate, a plurality of anti-friction elements having curvilinear surfaces disposed between said races in generally longitudinally extending series arrangement with the curvilinear surfaces of adjacent elements in constant engagement and with adjacent engaging elements offset linearly relative to one another, said longitudinal series arrangement of elements forming one linear sequence of elements contacting said pressure plate and another linear sequence of elements contacting said stationary wall means, one end of said series of elements engaging an abutment, and pressure applying means engaging the opposite end of said series of elements effecting longitudinally directed pressure on the said series of elements with resultant movement of said adjacent engaging element offset linearly to further move transversely of the longitudinal arrangement of the elements to effect thereby said axial movement of said plate.

6. A brake structure in accordance with claim 5 in which the anti-friction elements comprise a series of balls.

7. A brake structure in accordance with claim 5 in which the anti-friction elements comprise a series of cylinders arranged with the curvilinear surfaces of adjacent cylinders in engagement.

8. In a brake structure for a vehicle, rotatable and non-rotatable disk brake means engageable on relative axial movement, axially movable pressure plate means connected with one of said disk brake means to effect said relative axial movement of the said brake means, a plurality of pressure apply elements having curvilinear surfaces disposed in generally longitudinally extending series arrangement with the curvilinear surfaces of adjacent elements in engagement and with adjacent elements offset linearly relative to one another, the said longitudinal arrangement of the elements taking the general form of an annulus with the elements staggered axially to form two linear sequences with one sequence engaging said plate and the second sequence engaging the stationary wall means with one end of the series of elements engaging an abutment, pressure applying means comprising a hydraulic cylinder with a reciprocable piston therein, said piston having means engaging the opposite end of said series of elements to effect longitudinally directed pressure on the said series of elements with resultant movement of said linear sequence of elements engaging said plate relative to said sequence of elements engaging said stationary wall means to effect thereby said axial movement of said plate.

9. In a brake structure for a vehicle, rotatable and non-rotatable disk brake means engageable on relative axial movement, axially movable pressure plate means connected with one of said brake disk means to effect said relative axial movement of said brake means, a plurality of pressure applying elements having curvilinear surfaces disposed in generally longitudinally extending series arrangement with the curvilinear surfaces of adjacent elements in constant engagement with and with adjacent engaging elements offset linearly and relatively to one another, said elements being positioned between said plate and stationary wall means in an annular chamber with one end of the series of elements engaging an abutment, said abutment being movable in a direction longitudinal with said series of elements to effect movement of elements transversely of the longitudinal arrangement thereof for clearance adjustment between the rotatable and non-rotatable disk brake means, pressure applying means engaging the opposite end of said series of elements effecting longitudinal direct pressure on said series of elements with resultant movement of the curvilinear surfaces of the engaging elements in relation to each other and at least some of the elements transversely of the longitudinal arrangement of the elements to effect thereby said axial movement of said plate.

10. In a brake structure for a vehicle, rotatable and non-rotatable disk brake means engageable on relative axial movement, an axially movable pressure plate means in the form of an annulus engageable with one of said brake means to effect said relative axial movement of said brake means, said pressure plate means having a surface thereon forming an annular race for anti-friction elements, stationary wall means adjacent said pressure plate having an annular surface forming annular race for anti-friction elements and cooperating with that on said pressure plate, a plurality of anti-friction elements having curvilinear surfaces disposed between said races in generally longitudinally extending series arrangement with the curvilinear surfaces of the adjacent elements in constant engagement and with adjacent engaging elements offset linearly relative to one another, one end of said series of elements engaging an abutment, said abutment being movable in a direction longitudinally of the series of elements to effect the said transverse movement of the elements in regulated amounts for adjusting clearance between the non-rotatable and rotatable disk means, pressure applying means engaging the opposite end of said series of elements effecting longitudinally directed pressure on said series of elements with resultant movement of said adjacent elements offset linearly to further move transversely of the longitudinal arrangement of the elements to effect thereby said axial movement of said plate.

References Cited in the file of this patent

UNITED STATES PATENTS

| | | |
|---|---|---|
| 1,340,897 | Kelly et al. | May 25, 1920 |
| 1,804,185 | Skopik | May 5, 1931 |
| 1,998,533 | Brisson | Apr. 23, 1935 |
| 2,014,630 | O'Brien et al. | Sept. 17, 1935 |
| 2,024,328 | Batie | Dec. 17, 1935 |
| 2,042,850 | Knapp | June 2, 1936 |
| 2,115,661 | Zima | Apr. 26, 1938 |
| 2,245,988 | Lambert | June 17, 1941 |
| 2,248,171 | Hatch | July 18, 1941 |
| 2,307,652 | Whitten | Jan. 5, 1943 |
| 2,462,284 | Rauch | Feb. 22, 1949 |